United States Patent [19]

Genesky et al.

[11] 3,761,170
[45] Sept. 25, 1973

[54] PROJECTION LAMP MOUNTING APPARATUS

[75] Inventors: Leonard G. Genesky; Franklin D. Kottler; Robert F. Allen, all of Rochester, N.Y.

[73] Assignee: Eastman Kodak Company, Rochester, N.Y.

[22] Filed: Feb. 19, 1971

[21] Appl. No.: 116,776

[52] U.S. Cl. .................................. 353/87, 353/100
[51] Int. Cl. ...................... G03b 21/20, G03b 21/14
[58] Field of Search ...................... 353/85, 87, 100, 353/101, 122, 98, 99; 240/15.3, 52.1, 41 BM, 41 SC; 339/45 R, 45 T, 75 R, 75 P, 75 T

[56] References Cited
UNITED STATES PATENTS

| 1,675,690 | 7/1928 | Bohner | 240/41 BM |
| 1,985,459 | 12/1934 | Pratt | 339/45 T |
| 3,502,864 | 3/1970 | Wagner | 339/45 T |
| 3,547,530 | 12/1970 | Poole | 353/98 |

FOREIGN PATENTS OR APPLICATIONS

| 910,888 | 11/1962 | Great Britain | 339/75 T |

Primary Examiner—Louis R. Prince
Assistant Examiner—A. J. Mirabito
Attorney—W. H. J. Kline and James A. Smith

[57] ABSTRACT

A projection lamp mounting apparatus for adapting a projection lamp of the type having an ellipsoidal reflector for use in a photographic slide projector including a lamp support structure having a guide to position the lamp about the projector optical axis, and a wireform movable in one direction to urge the lamp into the projector and secure the lamp in position and movable in another direction to urge the lamp out of the projector.

4 Claims, 3 Drawing Figures

PATENTED SEP 25 1973 3,761,170

LEONARD G. GENESKY
FRANKLIN D. KOTTLER
ROBERT F. ALLEN
    INVENTORS

BY *James A. Smith*
   *W. H. J. Kline*
            ATTORNEYS

LEONARD G. GENESKY
FRANKLIN D. KOTTLER
ROBERT F. ALLEN
INVENTORS

3,761,170

PROJECTION LAMP MOUNTING APPARATUS

BACKGROUND OF THE INVENTION

1. Field of the Invention

This invention relates to light sources for projectors and, more particularly to apparatus for adapting a projection lamp of the type having an ellipsoidal reflector for use in a projector such as a photographic slide projector.

2. Description of the Prior Art

Illumination of the picture area of many presently available photographic slide projectors is accomplished through the use of a two-lens projection system having a projection lamp with a large filament directed toward, and in close proximity to a condenser lens to fill the projection lens with light. This arrangement requires a high wattage lamp to adequately illuminate the picture area, and as a consequence excessive heat is generated within the projector housing. To dissapate a portion of the heat, an opaque ceramic body is sometimes placed in contact with the transparent body of the lamp, and/or an exhaust fan is sometimes located in the projector housing to exhaust heated air.

Lighting arrangements have been suggested which use light sources that generate less heat. One such arrangement uses a projection lamp with a lower wattage bulb and a curved reflector to direct more light to the projection picture area. This lamp furnishes substantially the same illumination at a projector film gate as a higher wattage lamp, and the heat generated in the projector body is reduced significantly. Thus, this arrangement is desirable for use in a projector such as a slide projector. Conventional slide projectors, however, have limited space available for arranging the lamp and associated lens.

SUMMARY OF THE INVENTION

It is therefore an object of this invention to provide an improved mounting structure in a projector for a reflector type projection lamp.

It is another object of this invention to provide a mount for a reflector type projection lamp adapted for use in a projector such as a photographic slide projector and offering ease of insertion and ejection of the lamp.

It is still another object to provide a compact arrangement for mounting a projection lamp and at least one condenser lens in a compact projector lighting arrangement.

It is a further object of this invention to provide an improved projector illumination system.

A light mounting apparatus in accordance with one embodiment of the invention is adapted for use with a reflector type projection lamp in a projector such as a photographic slide projector having a condenser lens and a projection lens. The apparatus includes means for inserting the lamp into the projector and for ejecting the lamp from the projector including a base and having an upright lamp positioning member defining an aperture provided with lamp positioning stops located adjacent the lower periphery for centering lamp to the aperture. A wireform is pivotally mounted at one end to the base whereby a segment of the wireform engages the lamp during movement of the wireform in one direction to urge the lamp into the mount and onto the position stops. Pivoting of the wireform in the other direction moves another segment of the wireform into engagement with the lamp to urge the lamp out of the projector.

A second wireform may be provided to retain the condenser lens in an operative position with respect to the lamp.

BRIEF DESCRIPTION OF THE DRAWINGS

Other objects an advantages of the invention will become apparent from the following description taken in connection with the accompanying drawings, wherein.

DETAILED DESCRIPTION OF THE DRAWINGS

Figure 1:
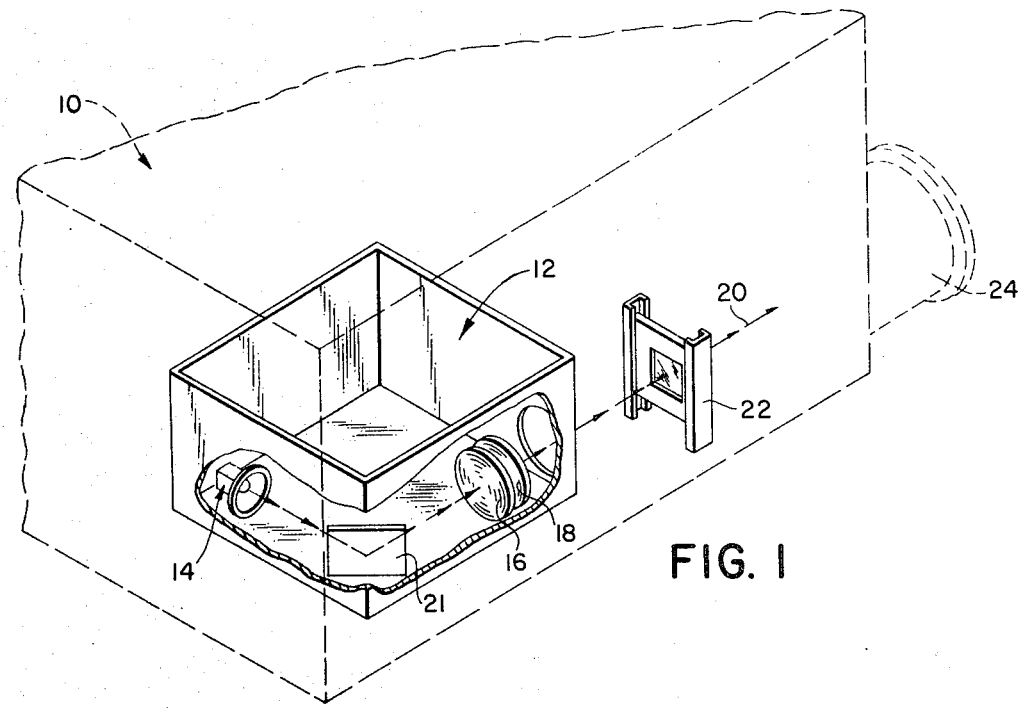
FIG. 1 is a generally schematic view showing a lighting apparatus in accordance with the invention in a slide projector.
Figure 3:
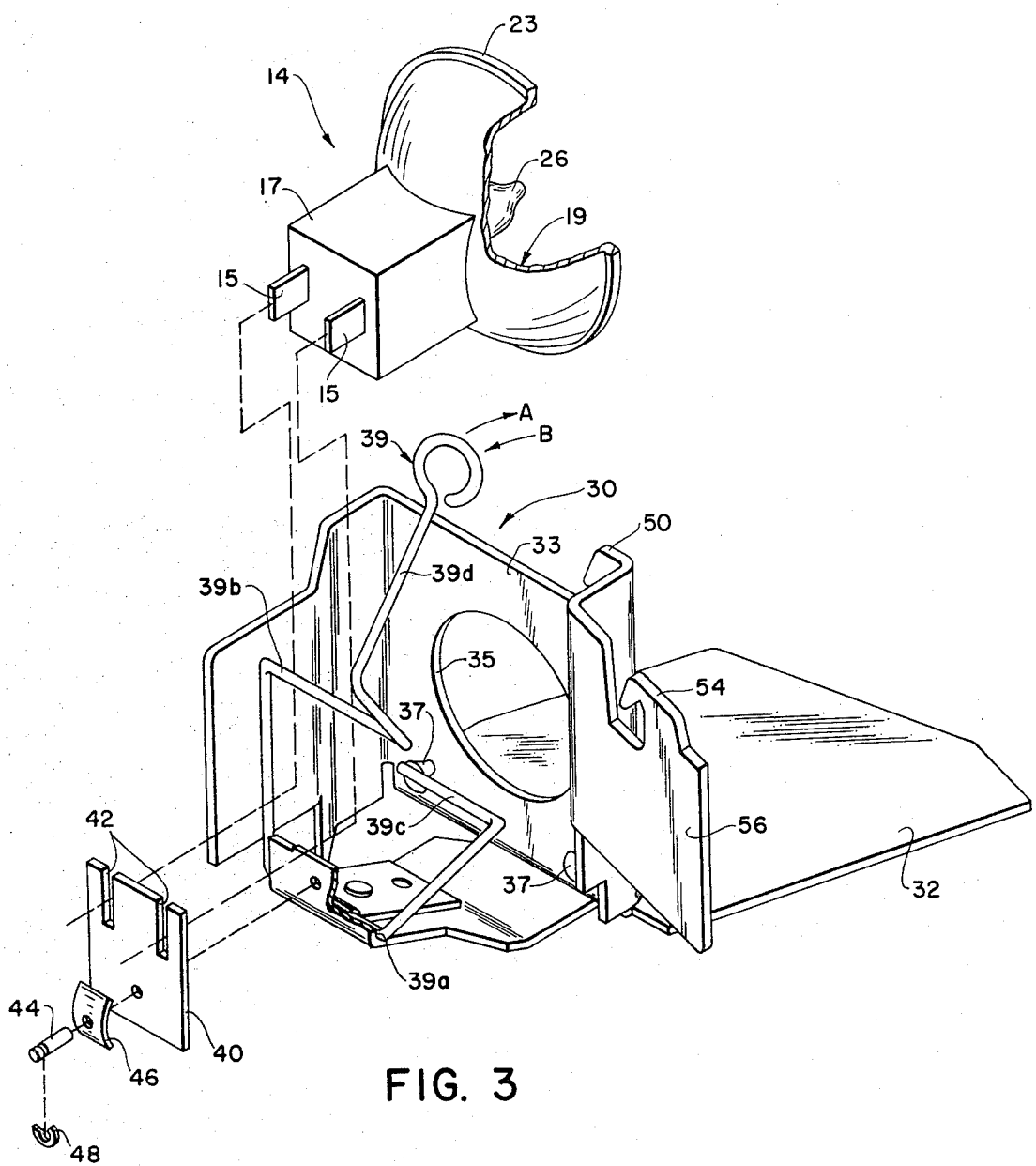
FIG. 3 is an orthogonal view of the lamp mount of FIG. 1 showing the relationship of the lamp and the mount, with a cut-away view of the lamp showing the filament bulb located in the reflector surface.

Referring now to FIG. 1 there is shown a portion of a slide projector 10 which may comprise a commercially available projector such as the Kodak Carousel Projector Model 800, and which includes a compartment 12 for housing a projection lamp 14, a heat absorbing glass 16, and a condenser lens 18 that is optically aligned with a film gate 22 and a projection lens 24 on an optical axis 20 of the projector 10. The projection lamp 14 as best shown in FIG. 3 is preferably a reflector lamp having two contact pins 15 on a base 17 and a dichroic ellipsoidal reflecting surface 19 with a flange 23. The ellipsoidal configuration of the lamp reflecting surface exhibits a major and a minor focal point, and when a filament bulb 26 is located at the major focal point of the ellipsoid, an image of the filament is produced at the minor focal point. As shown in FIG. 1 the lamp is positioned at an angle to the projector optical axis 20 where a reflecting surface 21 is placed at an angle to the lamp 14 to reflect the light from the lamp 14 along the optical axis 20 of the projector 10. To fully utilize the characteristics of the ellipsoidal reflector 19 to fill the projection lens 24 with light, it is advantageous to place the lamp 14 relative to the depth of field of the condenser lens 18 so that both the filament and its image are projected into the projection lens 24. However, mounting the lamp 14 in an in-line manner within the compartment 12 of many commercially available projectors would require more room than is usually available.

Figure 2:
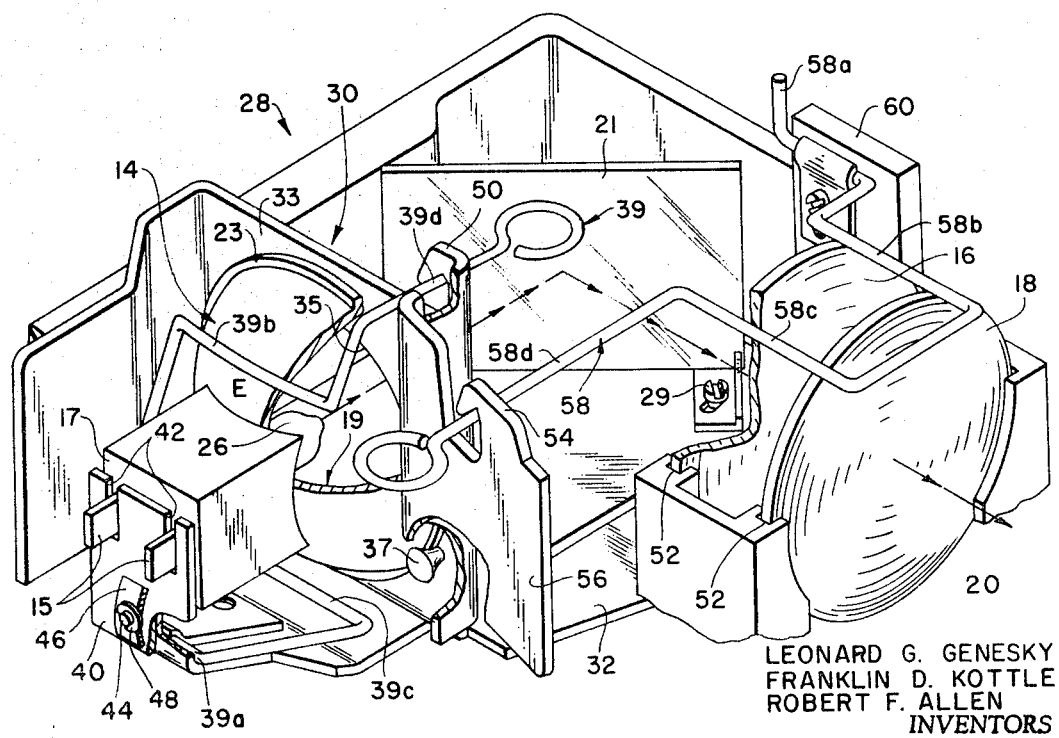
FIG. 2 is a perspective view showing the lighting apparatus of FIG. 1 removed from the projector.

In accordance with the invention, sufficient space is made available by providing a simple compact unit designated generally as 28 and shown in FIG. 2 which positions the lamp 14 within the compartment 12 at an angle to the projection axis 20 and to the reflecting surface 21. The reflecting surface 21 is attached within unit 28 in slots 29 for movement with respect to the optical axis 20 of the projector 10 so that light may be adjustably reflected along the projection axis 20. For clarity, the apparatus of FIG. 2 is shown in an upright position whereas the actual mounting within the compartment 12 is upside down from that SHOWN in FIG. 2. The unit includes a mount 30 having a base plate 32 and an upright member 33 which defines an aperture 35 positioned centrally therein in vertical planar relation to the base 32 so that the axis of the aperture 35 is positioned in vertical relation with the optical axis 20 of the photographic projector 10. The upright member 33 as shown in FIGS. 2 and 3, is provided with two cone-shaped position stops 37 located adjacent to the lower edge of the aperture 35 to be engaged by the lamp 14 and determine its position in relation to the upright member 33 and centered on the aperture 35.

A wireform 39 is provided on the mount 30 to facilitate insertion of the lamp 14 into the projector 10 and onto mount 30, and removal of the lamp 14 from the projector 10. The wireform 39 has a transverse segment 39a pivotally attached to the base plate 32 and is pivotal relative to the base plate 32 in the direction of arrows A and B (FIG. 3). As may be seen in FIG. 3, as the transverse end segment 39b of the wireform is moved in the direction of arrow A, the transverse end segment 39c will also move in the direction of arrow A. As the segment 39b is moved in the direction of arrow B, the segment 39c will move in the direction of arrow B.

A lamp socket 40 having slots 42 is attached to the base 32 in relation to the aperture 35. As the lamp 14 is positioned in the mount 30, the contact pins 15 of the lamp base 17 may be aligned with the socket 40 for the pins 15 to slide into the slots 42. The socket 40 is attached to the base 32 by a spring loaded mounting post 44 having a leaf spring 46 and horseshoe clip 48 so that as the pins 15 slide into the slots 42, the lamp 14 is self-aligning in the mount 30.

To insert the lamp 14 into the projector 10 the wireform is moved to the position shown in FIG. 3 and the lamp is seated in the mount 30 with the reflector 19 adjacent to the upright member 33, the pins 15 engaging the slots 42, and the segment 39c engaging and temporarily supporting the bottom portion of the reflector surface 19. The wireform 39 is then pivoted in the direction of arrow A, causing the segment 39c to move downward and ride along the outer portion of the reflecting surface 19 until the transverse segment 39b of the wireform 39 contacts the reflector surface at a point E. Further movement of the wireform segment 39b will firmly urge the reflector flange 26 into engagement with the cone-shaped stops 37 with the reflector in alignment with the aperture 35 and the reflector flange 26 against the upright member 33 as shown in FIG. 2. Coincident with the movement of lamp 14 down into the mount 30, the pins 15 of base 17 slide into the slots 42 of socket 40. The segment 39b of the wireform is then resiliently displaced to the position shown in FIG. 2 where a hooked piece 50 on the outer periphery of the upright member 33 is engaged by a substantially straight segment 39d of the wireform 39, clamping the lamp 14 into the mount 30.

The heat absorbing glass 16 and condenser lens 18 are mounted in suitable slots 52 formed in juxtaposed surfaces of the compartment 12 and may be retained by a second hooked piece 54 on an extension 56 of the upright member 33 and a second wireform 58 pivotally mounted to the compartment wall 48. The wireform 58 has one portion 58a which may be pivotally attached to the compartment 12 at a convenient place on the wall 60 and having transverse sections 58b and 58c which contact the periphery of the heat absorbing glass 16 and the condenser lens 18 to retain them in the slots 52 when the substantially straight end 58d is bent and hooked into the hooked piece 54.

To eject the lamp 14 from the mount 30, the wireform 39 is released from the hooked piece 50 and pivoted in the direction of arrow B. This pivotal motion of the wireform 39 produces a movement of the extended piece 39c in the direction of arrow B, and as the piece 39c moves upward it contacts the reflecting surface 11, urging the lamp 14 out of the mount 30. Similarly heat absorbing glass 16 and the condenser lens 18 may be removed by releasing the second wireform 58 from the hooked piece 54.

The invention has been described in detail with particular reference to a preferred embodiment thereof, but it will be understood that variations and modifications can be effected within the spirit and scope of the invention.

We claim:

1. Apparatus for mounting a reflector lamp in a projector, said apparatus comprising:
   a base;
   an apertured member extending from said base;
   position means adapted for receiving a reflector lamp and located in spaced relation to said apertured member at a position relative to the aperture for locating a received reflector lamp in alignment with said aperture;
   a wireform, movably mounted on said base and having first and second formed segments, said wireform being disposable in a first position in which said first formed segment supports and grossly positions a received reflector lamp relative to said position means, said wireform being movable so that during movement of said wireform from said first position to a second position, said first formed segment carries a supported lamp into aligning operation with said position means, said second formed segment being movable during movement of said wireform from said first position to said second position to engage a received lamp and to urge the lamp into engagement with said position means and into alignment with said aperture, said first formed segment, during return movement of said wireform from said second position to said first position contacting and moving the lamp away from said position means; and
   means for retaining said wireform in a position in which said second formed segment retains the lamp in alignment with said aperture.

2. Apparatus as claimed in claim 1 including a reflecting surface adjustably attached to said base, and positioned at an angle to said aperture.

3. Apparatus as claimed in claim 1 wherein said apparatus includes a lamp socket mounted to said base.

4. A mount for positioning and retaining a reflector lamp relative to an axis, said mount comprising:
   lamp support means, disposed in a predetermined position to said axis;
   stop means on said support means for positioning a lamp received thereby relative to said axis;
   a wireform, mounted for movement between first and second positions relative to said support means, said wireform having a first portion which in said first position, is positioned relative to said support means to receive a lamp and which during movement of said wireform to said second position, carries a supported lamp into operative relation with said stop means, said wireform having a second portion which, upon movement of said wireform from said first position to said second position, urges a lamp onto said stop means and into alignment with said axis, said first wireform portion, upon movement of said wireform to said first position from said second position, being engageable with said lamp on said stop means to move said lamp away from said stop means; and means for retaining said wireform in said second position urging the lamp onto said stop.

* * * * *